United States Patent
Watanabe et al.

(10) Patent No.: US 11,228,691 B2
(45) Date of Patent: Jan. 18, 2022

(54) IMAGE PROCESSING SYSTEM, IMAGE READING APPARATUS, AND IMAGE PROCESSING METHOD

(71) Applicant: PFU Limited, Ishikawa (JP)

(72) Inventors: Akiko Watanabe, Ishikawa (JP); Naofumi Kado, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 17/124,362

(22) Filed: Dec. 16, 2020

(65) Prior Publication Data

US 2021/0266419 A1 Aug. 26, 2021

(30) Foreign Application Priority Data

Feb. 20, 2020 (JP) .............................. JP2020-027183

(51) Int. Cl.
*H04N 1/04* (2006.01)
*H04N 1/00* (2006.01)
*H04N 1/047* (2006.01)

(52) U.S. Cl.
CPC ..... *H04N 1/00803* (2013.01); *H04N 1/00037* (2013.01); *H04N 1/00209* (2013.01); *H04N 1/00824* (2013.01); *H04N 1/0473* (2013.01)

(58) Field of Classification Search
CPC ........... H04N 1/00803; H04N 1/00037; H04N 1/00209; H04N 1/00824; H04N 1/00405; H04N 1/0473
See application file for complete search history.

(56) References Cited

U.S. PATENT DOCUMENTS

| | | | |
|---|---|---|---|
| 2008/0040259 A1* | 2/2008 | Snow ................... | G06Q 40/025 705/38 |
| 2008/0244618 A1* | 10/2008 | Kudo .................... | G06F 3/1229 719/318 |
| 2009/0175504 A1 | 7/2009 | Koarai | |
| 2011/0279849 A1* | 11/2011 | Umi .................... | H04N 1/00588 358/1.14 |
| 2019/0238710 A1* | 8/2019 | Arifuku ............. | H04N 1/00453 |

FOREIGN PATENT DOCUMENTS

JP 2008-283494 A 11/2008

* cited by examiner

*Primary Examiner* — Moustapha Diaby
(74) *Attorney, Agent, or Firm* — McDermott Will & Emery LLP (57) ABSTRACT

In an image processing system, an image reading apparatus determines whether an error occurs on a read image that is an image read by an image sensor, and generates and transmits data including the read image and error information that is information indicating presence or absence of occurrence of the error, and an image processing apparatus receives the data and performs, on the read image, image processing corresponding to the presence or absence of occurrence of the error, based on the error information.

6 Claims, 9 Drawing Sheets

IMAGE PROCESSING SYSTEM, IMAGE READING APPARATUS, AND IMAGE PROCESSING METHOD

CROSS-REFERENCE TO RELATED APPLICATION

The present application claims priority to and incorporates by reference the entire contents of Japanese Patent Application No. 2020-027183 filed on Feb. 20, 2020.

FIELD

The present disclosure relates to an image processing system, an image reading apparatus, and an image processing method.

BACKGROUND

An image processing system that includes an image reading apparatus such as a scanner device and the like and an image processing apparatus such as a cloud server device and the like has been known. In such an image processing system, an image read by an image sensor of the image reading apparatus (hereinafter may be referred to as "read image") may be transmitted from the image reading apparatus to the image processing apparatus and, by the image processing apparatus, image processing may be performed on the read image received from the image reading apparatus. For example, when the read image includes an image of a medium to be an object of reading by the image reading apparatus (hereinafter may be referred to as "reading medium"), in the image processing apparatus, processing of extracting the image of the reading medium (hereinafter may be referred to as "medium image") from the read image is performed, as the image processing. Examples of the reading medium include a name card and a receipt.

Example of related-art is described in Japanese Patent Application Laid-open No. 2008-283494.

In the image processing apparatus, when it is determined by using image analysis whether the read image received from the image reading apparatus is a proper image, a processing load of the image processing apparatus is increased.

SUMMARY

According to an aspect of an embodiment, an image processing system includes an image reading apparatus and an image processing apparatus. The image reading apparatus is configured to determine whether an error occurs on a read image that is an image read by an image sensor, to generate data including the read image and error information that is information indicating presence or absence of occurrence of the error, and to transmit the data. The image processing apparatus is configured to receive the data and to perform, on the read image, image processing corresponding to the presence or absence of occurrence of the error, based on the error information.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

Preferred embodiments of the present disclosure will be explained with reference to accompanying drawings. The following embodiments, however, are not intended to limit the technology of the present disclosure. In the following embodiments, identical constituent elements are denoted by identical reference signs.

First Embodiment

Configuration of Image Processing System

Figure 1:
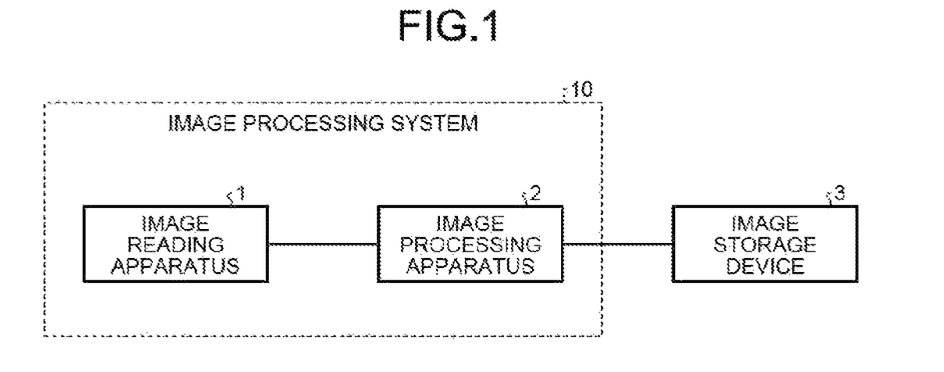
FIG. 1 is a diagram illustrating a configuration example of an image processing system of a first embodiment of the present disclosure.

FIG. 1 is a diagram illustrating a configuration example of an image processing system of a first embodiment of the present disclosure. In FIG. 1, an image processing system 10 includes an image reading apparatus 1 and an image processing apparatus 2. The image processing apparatus 2 is connected to an image storage device 3 that is arranged outside of the image processing system 10. Examples of the image reading apparatus 1 include a scanner device.

Examples of the image processing apparatus 2 and the image storage device 3 include a cloud server device.

Configuration of Image Reading Apparatus

Figure 2:
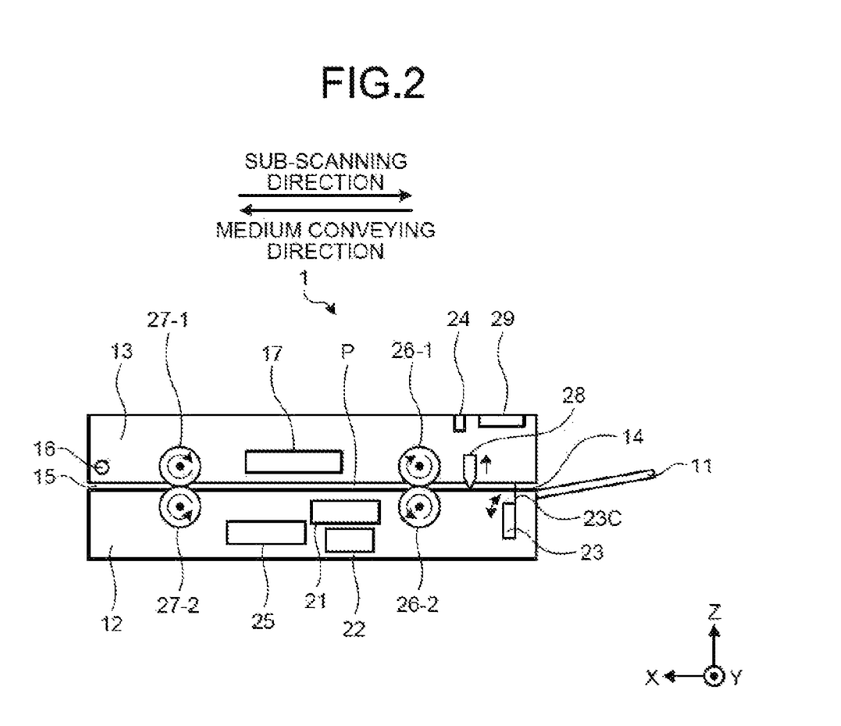
FIG. 2 is a diagram illustrating a configuration example of an image reading apparatus of the first embodiment of the present disclosure.
Figure 3:
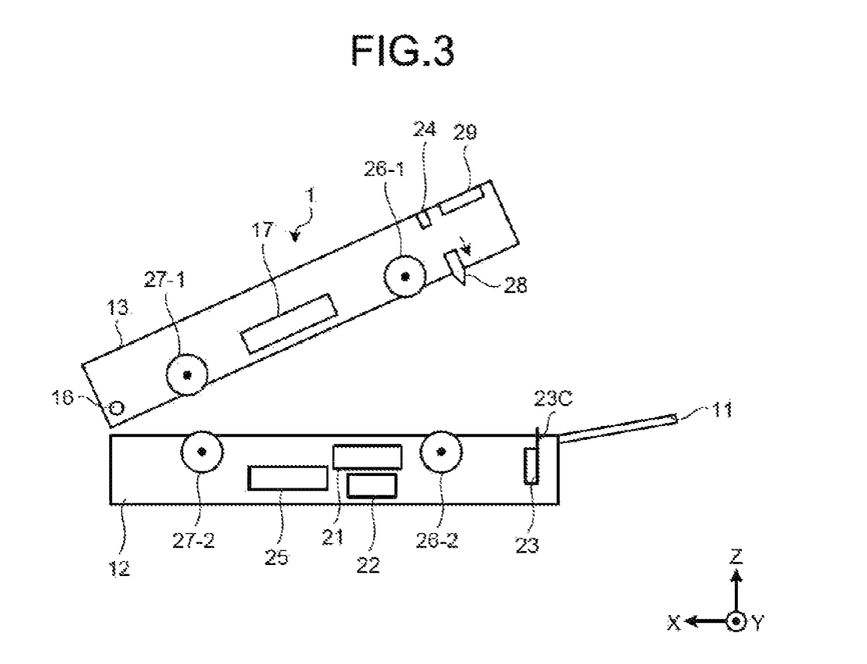
FIG. 3 is a diagram illustrating a configuration example of the image reading apparatus of the first embodiment of the present disclosure.
Figure 4:
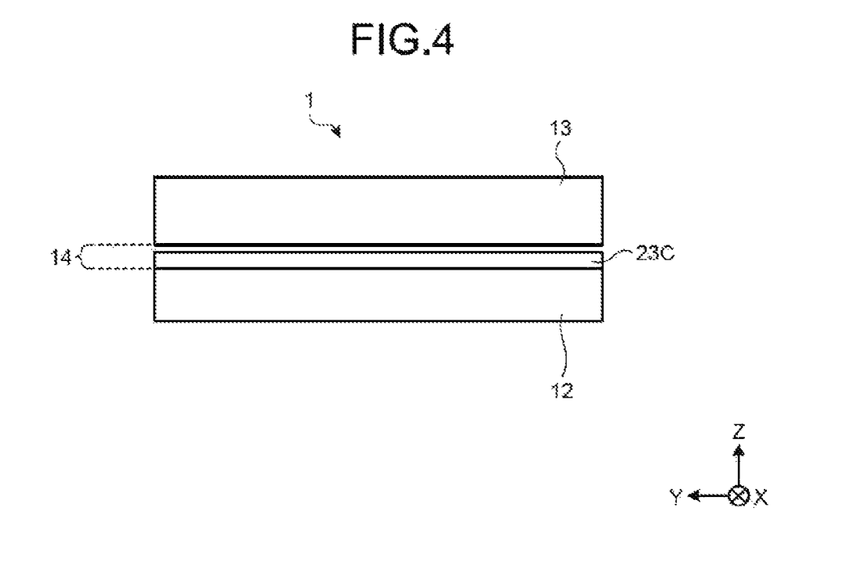
FIG. 4 is a diagram illustrating a configuration example of the image reading apparatus of the first embodiment of the present disclosure.
Figure 5:
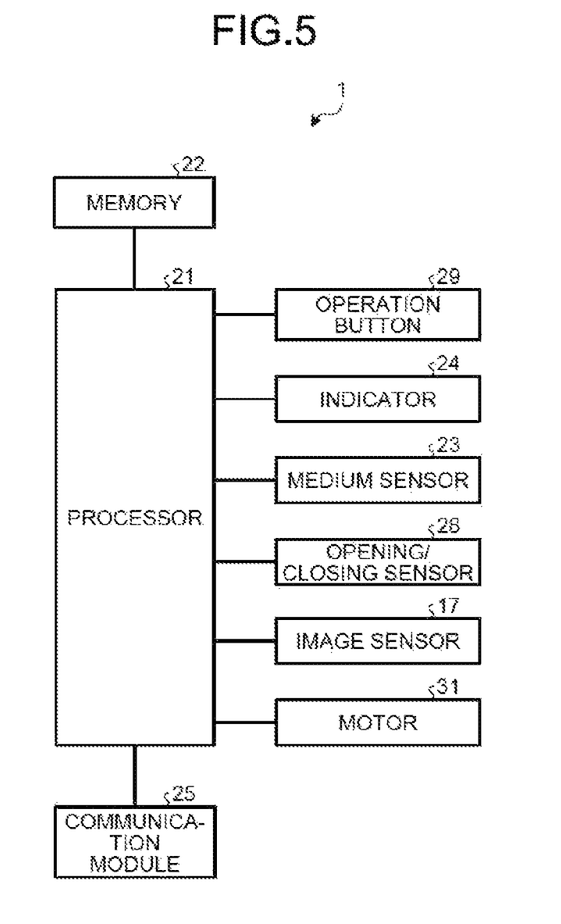
FIG. 5 is a diagram illustrating one example of functional blocks of the image reading apparatus of the first embodiment of the present disclosure.

FIG. 2, FIG. 3, and FIG. 4 are diagrams illustrating configuration examples of the image reading apparatus of the first embodiment of the present disclosure. FIG. 5 is a diagram illustrating one example of functional blocks of the image reading apparatus of the first embodiment of the present disclosure.

In FIG. 2 and FIG. 3, an upper cover 13 is a cover that can be opened and closed, and in FIG. 2, a state in which the upper cover 13 is closed is illustrated and, in FIG. 3, a state in which the upper cover 13 is opened is illustrated. The upper cover 13 is opened to remove a reading medium from a conveying path P, when a paper jam of the reading medium that is present in the conveying path P occurs, for example.

In FIG. 2 and FIG. 3, the image reading apparatus 1 includes an original platen 11, a lower housing 12, the upper cover 13 as an upper housing, a medium insertion port 14, a medium discharge port 15, a pivot 16, an image sensor 17, the conveying path P, carriage rollers 26-1 and 26-2, and discharge rollers 27-1 and 27-2. In the following description, the carriage rollers 26-1 and 26-2 may collectively be referred to as "carriage rollers 26", and the discharge rollers 27-1 and 27-2 may collectively be referred to as "discharge rollers 27".

The image reading apparatus 1 further includes a processor 21, a memory 22, a communication module 25, an operation button 29, an indicator 24, a medium sensor 23, and an opening/closing sensor 28.

In the lower housing 12, the medium sensor 23, the carriage roller 26-2, the processor 21, the memory 22, the communication module 25, and the discharge roller 27-2 are housed.

In the upper cover 13, the opening/closing sensor 28, the carriage roller 26-1, the image sensor 17, and the discharge roller 27-1 are housed.

The upper cover 13 is, as illustrated in FIG. 2 and FIG. 3, openable and closable centering on the pivot 16. Furthermore, as illustrated in FIG. 2, between the upper cover 13 and the lower housing 12, the conveying path P through which a reading medium is conveyed in a +X direction is formed, and in a state in which the upper cover 13 is closed (FIG. 2), the upper cover 13 covers the conveying path P. Because the conveying direction of the reading medium (hereinafter may be referred to as "medium conveying direction") in the conveying path P is the +X direction, the sub-scanning direction of the image sensor 17 is a −X direction that is an opposite direction to the medium conveying direction.

The opening/closing sensor 28 is movable up and down. When the upper cover 13 is closed (FIG. 2), because the tip of the opening/closing sensor 28 makes contact with the lower housing 12 and the opening/closing sensor 28 is pushed upward, the opening/closing sensor 28 is turned on. Meanwhile, when the upper cover 13 is opened (FIG. 3), the opening/closing sensor 28 is turned off, because the opening/closing sensor 28 moves downward.

The medium sensor 23 includes a contactor 23C. The medium sensor 23 turns off when the reading medium is not in contact with the contactor 23C while turning on when the reading medium is in contact with the contactor 23C. As illustrated in FIG. 4, the contactor 23C has a flap shape for which the full width is substantially identical to the full width of the medium insertion port 14 and, when the reading medium is not in contact with the contactor 23C, stands erect so as to block the medium insertion port 14. Then, when the reading medium is inserted into the medium insertion port 14 and the reading medium makes contact with the contactor 23C, the contactor 23C collapses, thereby turning the medium sensor 23 on.

In FIG. 5, the image reading apparatus 1 further includes a motor 31. The operation button 29, the indicator 24, the medium sensor 23, the opening/closing sensor 28, the image sensor 17, the motor 31, the memory 22, and the communication module 25 are electrically connected to the processor 21.

In FIG. 2, when the operation button 29 is pressed and when the reading medium inserted to the conveying path P from the medium insertion port 14 along the upper surface of the original platen 11 makes contact with the contactor 23C and the medium sensor 23 is turned on, the processor 21 starts operating the motor 31 that drives the carriage rollers 26 and the discharge rollers 27. Because the carriage rollers 26 and the discharge rollers 27 start rotating along with the start of the operation of the motor 31, conveying of the reading medium on the conveying path P is started. While the carriage roller 26-2 and the discharge roller 27-2 rotate counterclockwise, the carriage roller 26-1 and the discharge roller 27-1 rotate clockwise.

The reading medium that passes through between the carriage roller 26-1 and the carriage roller 26-2 is read by the image sensor 17, along with conveying.

The reading medium that has been subjected to reading then passes through between the discharge roller 27-1 and the discharge roller 27-2 and is discharged from the medium discharge port 15.

The image reading apparatus 1 may include, in place of the above-described opening/closing sensor 28, a protrusion protruding downward from the lower surface of the upper cover 13 (hereinafter may be referred to as "lower protrusion") and an opening/closing sensor SE provided on the lower housing 12 facing the lower protrusion. While the opening/closing sensor SE is turned on as the opening/closing sensor SE is pressed by the lower protrusion when the upper cover 13 is closed, the opening/closing sensor SE is turned off as the lower protrusion separates from the opening/closing sensor SE when the upper cover 13 is opened.

Configuration of Image Processing Apparatus

Figure 6:
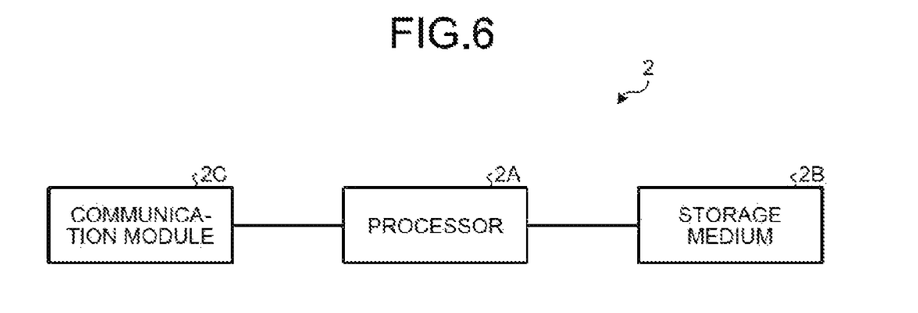
FIG. 6 is a diagram illustrating one example of functional blocks of an image processing apparatus of the first embodiment of the present disclosure.

FIG. 6 is a diagram illustrating one example of functional blocks of the image processing apparatus of the first embodiment of the present disclosure. In FIG. 6, the image processing apparatus 2 includes a processor 2A, a storage medium 2B, and a communication module 2C.

Processing of Image Reading Apparatus

Figure 7:
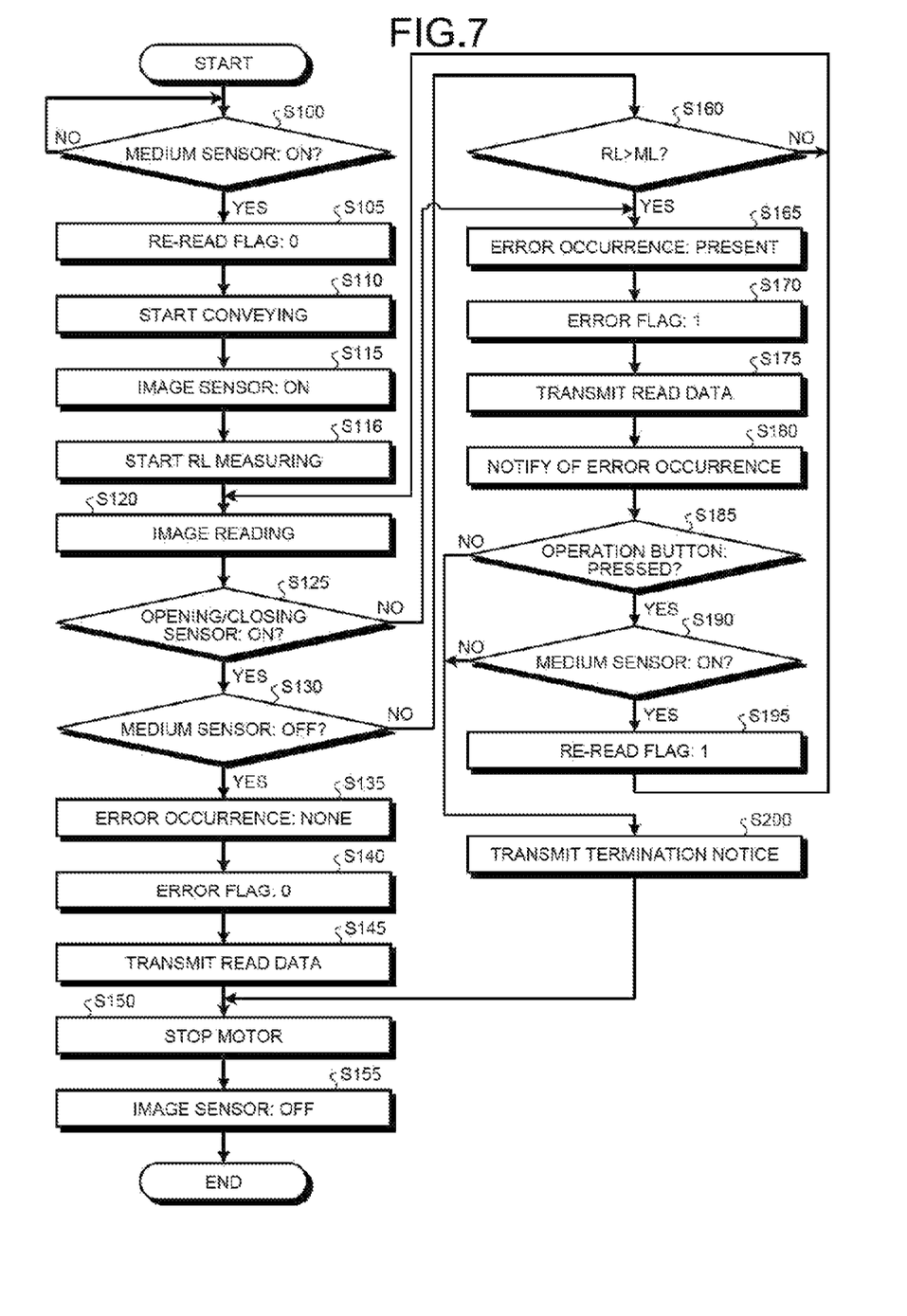
FIG. 7 is a flowchart illustrating one example of a processing procedure in the image reading apparatus of the first embodiment of the present disclosure.

FIG. 7 is a flowchart illustrating one example of a processing procedure in the image reading apparatus of the first embodiment of the present disclosure. The flowchart illustrated in FIG. 7 is started when the operation button 29 is pressed, for example.

In FIG. 7, at Step S100, the processor 21 determines whether the medium sensor 23 is turned on, and waits until the medium sensor 23 is turned on (No at Step S100).

When the reading medium is inserted into the medium insertion port 14 and the medium sensor 23 is turned on (Yes at Step S100), the processor 21 performs initialization by setting a re-read flag RF to "0" at Step S105, starts conveying of the reading medium by starting the operation of the motor 31 at Step S110, turns the image sensor 17 on at Step S115, and starts measuring an image read length RL at Step S116. By the processing at Step S110 and Step S115, reading of the medium image by the image sensor 17 is started. The re-read flag RF being "0" indicates that re-reading of the reading medium is not performed, and the re-read flag RF being "1" indicates that re-reading of the reading medium is performed.

The motor 31 rotates as motor pulses are continuously given from the processor 21. As the carriage rollers 26 and the discharge rollers 27 rotate along with the rotation of the motor 31, the reading medium is conveyed on the conveying path P. A conveying distance j of the reading medium per one motor pulse is 0.0844 millimeters, for example. Accordingly, the current image read length RL (mm) of the reading medium in conveying is expressed by, using a count number of the motor pulses (hereinafter may be referred to as "pulse count number"), "RL=j×pulse count number". The processor 21 then starts measuring the image read length RL by starting the counting of the motor pulses at Step S116.

At Step S120, the image sensor 17 reads the medium image along with the conveying of the reading medium.

At Step S125, the processor 21 determines whether the opening/closing sensor 28 is turned on. When the opening/closing sensor 28 is turned on, that is, when the upper cover 13 is closed (Yes at Step S125), the processing proceeds to Step S130. Meanwhile, when the opening/closing sensor 28 is turned off, that is, when the upper cover 13 is opened (No at Step S125), the processing proceeds to Step S165.

At Step S130, the processor 21 determines whether the medium sensor 23 is turned off. When the medium sensor 23 is turned off, that is, when there is no reading medium present at the medium insertion port 14 (Yes at Step S130), the processing proceeds to Step S135. Meanwhile, when the medium sensor 23 is turned on, that is, when the reading medium is present at the medium insertion port 14 (No at Step S130), the processing proceeds to Step S160.

At Step S135, the processor 21 determines that no error has occurred on a read image RI including the medium image (error occurrence: none). Then, at Step S140, the processor 21 sets an error flag EF to "0". The error flag EF being "0" indicates that no error has occurred on the read image RI, and the error flag EF being "1" indicates that an error has occurred on the read image RI.

At Step S145, the processor 21 generates read data RD including the read image RI, the error flag EF set to "0", and the re-read flag RF set to "0", and transmits the generated read data RD to the image processing apparatus 2 by using the communication module 25. After the processing of Step S145, the processing proceeds to Step S150.

Meanwhile, at Step S160, the processor 21 determines whether the current image read length RL has exceeded a maximum value ML of the image read length RL (hereinafter may be referred to as "read maximum length") in the image reading apparatus 1. The read maximum length ML is set in the memory 22 in advance before shipping the image reading apparatus 1 and is determined based on the upper limit value of a storage area size for the read image RI in the memory 22, for example. As one example, the read maximum length ML is set to 830 millimeters. When the current image read length RL does not exceed the read maximum length ML (No at Step S160), the processing returns to Step S120 and the reading of the medium image is continued. Meanwhile, when the current image read length RL has exceeded the read maximum length ML (Yes at Step S160), the processing proceeds to Step S165.

At Step S165, the processor 21 determines that an error has occurred on the read image RI including the medium image (error occurrence: present). Then, at Step S170, the processor 21 sets the error flag EF to "1".

At Step S175, the processor 21 generates the read data RD including the read image RI, the error flag EF set to "1", and the re-read flag RF set to "0" or "1", and transmits the generated read data RD to the image processing apparatus 2 by using the communication module 25. After the processing of Step S175, the processing proceeds to Step S180.

At Step S180, the processor 21 notifies a user of the image reading apparatus 1 of the fact that an error has occurred on the read image RI, by lighting the indicator 24 in red, for example.

Then, at Step S185, the processor 21 determines, within a certain time Δta from the time of notification of Step S180, whether the opening/closing sensor 28 that has been on is turned on from off again after being turned off once (that is, the upper cover 13 is closed again after being opened once) and whether the operation button 29 is pressed after the opening/closing sensor 28 is turned on from off. Within the certain time Δta from the time of notification of Step S180, when the opening/closing sensor 28 that has been on is turned on from off again after being turned off once and also the operation button 29 is pressed after the opening/closing sensor 28 is turned on from off (Yes at Step S185), the processing proceeds to Step S190. Meanwhile, within the certain time Δta from the time of notification of Step S180, when the opening/closing sensor 28 that has been on is not turned off, when the opening/closing sensor 28 that has been turned off from on once is not turned on again, or when the operation button 29 is not pressed (No at Step S185), the processing proceeds to Step S200.

At Step S190, the processor 21 determines whether the medium sensor 23 is turned on. When the medium sensor 23 is turned on, that is, when the reading medium is present at the medium insertion port 14 (Yes at Step S190), the processing proceeds to Step S195. Meanwhile, when the medium sensor 23 is turned off, that is, when there is no reading medium present at the medium insertion port 14 (No at Step S190), the processing proceeds to Step S200.

At Step S195, the processor 21 determines that re-reading of the reading medium that causes the occurrence of the error of the read image RI is to be performed and sets the re-read flag RF to "1". After the processing of Step S195, the processing returns to Step S120, and the re-reading of the reading medium that causes the occurrence of the error at Step S165 is performed.

At Step S200, the processor 21 determines to terminate reading of the image without performing re-reading of the reading medium that causes the occurrence of the error of the read image RI, and transmits a termination notice to the image processing apparatus 2 by using the communication module 25. After the processing of Step S200, the processing proceeds to Step S150.

At Step S150 and Step S155, the processor 21 stops the operation of the motor 31 and also turns the image sensor 17 off, after an elapse of a certain time Δtb from the time of detecting the medium sensor 23 being turned off at Step S130 or Step S190 (Yes at Step S130 or No at Step S190). With the processing of Step S155, the flowchart illustrated in FIG. 7 is terminated. The certain time Δtb is set in advance to a sufficient time needed to complete discharging the reading medium that is discharged from the medium discharge port 15.

Configuration of Read Data

Figure 8:
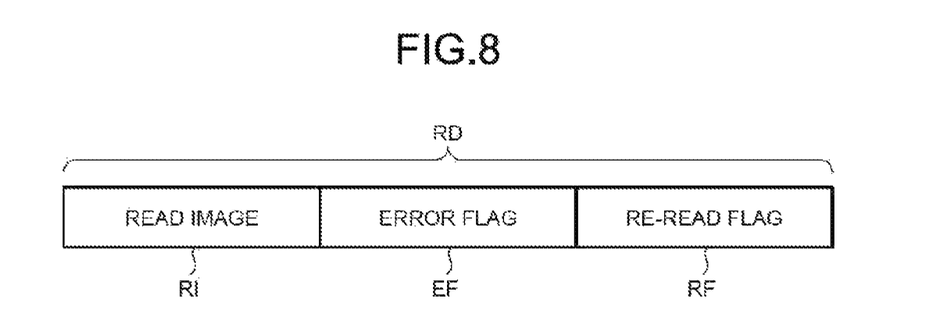
FIG. 8 is a diagram illustrating a configuration example of read data of the first embodiment of the present disclosure.

FIG. 8 is a diagram illustrating a configuration example of the read data of the first embodiment of the present disclosure. In FIG. 8, the read data RD includes the read image RI, the error flag EF, and the re-read flag RF. The read image RI includes a single or a plurality of medium images. In the read data RD, the error flag EF and the re-read flag RF are transmitted from the image reading apparatus 1 to the image processing apparatus 2 by using conventional free space of the read data.

Out of the read image RI, the error flag EF, and the re-read flag RF, the re-read flag RF need not be included in the read data RD and may be transmitted separately from the read image RI and the error flag EF.

Processing of Image Processing Apparatus

Figure 9:
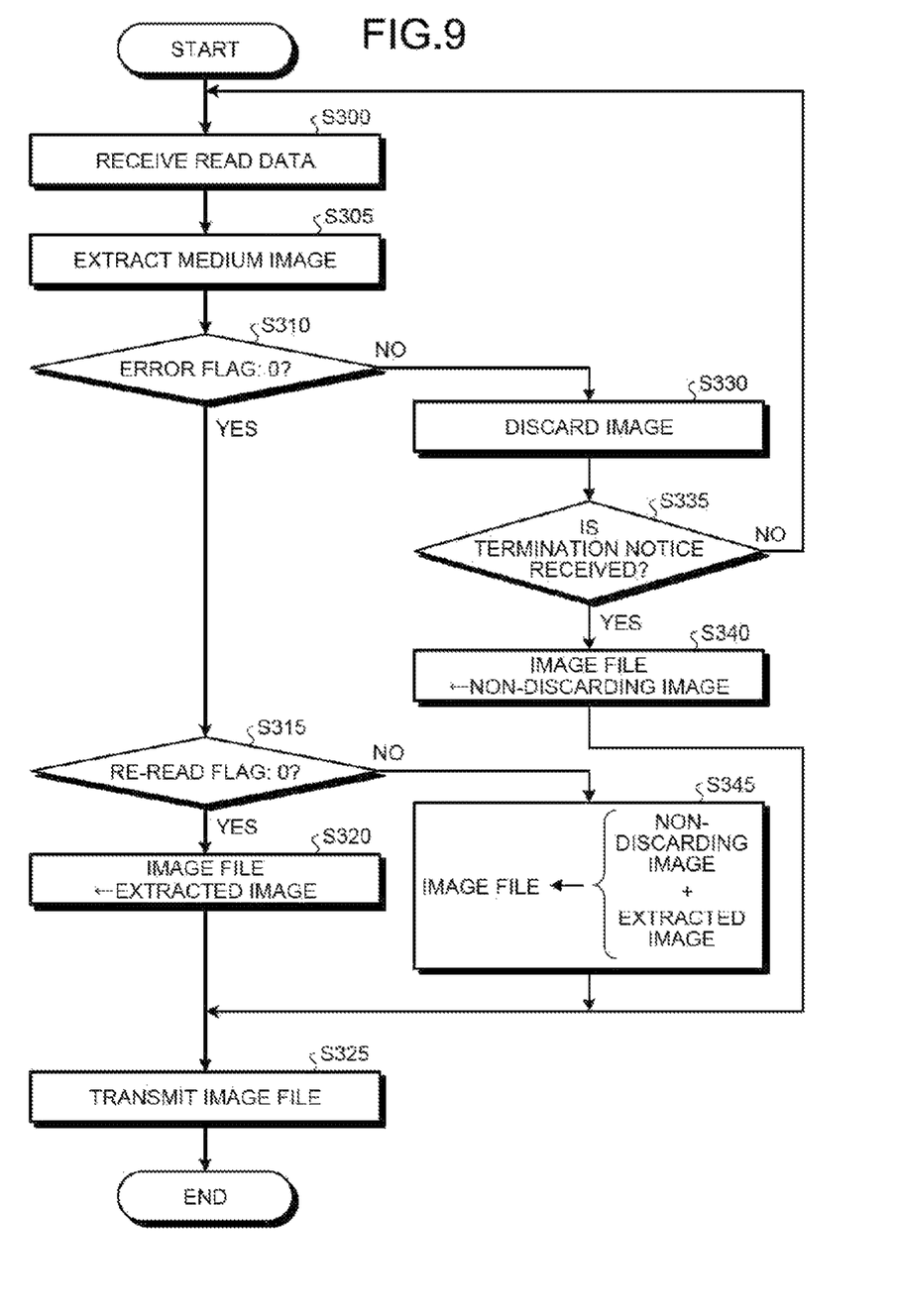
FIG. 9 is a flowchart illustrating one example of a processing procedure in the image processing apparatus of the first embodiment of the present disclosure.

FIG. 9 is a flowchart illustrating one example of a processing procedure in the image processing apparatus of the first embodiment of the present disclosure. The flowchart illustrated in FIG. 9 is started when the read data RD transmitted from the image reading apparatus 1 is received by the image processing apparatus 2.

In FIG. 9, at Step S300, the processor 2A receives the read data RD transmitted from the image reading apparatus 1 via the communication module 2C.

Then, at Step S305, the processor 2A acquires the read image RI from the read data RD, and extracts medium images included in the acquired read image RI from the read image RI. In the following description, the medium images extracted from the read image RI may be referred to as "extracted images".

Then, at Step S310, the processor 2A acquires the error flag EF from the read data RD, and determines whether the acquired error flag EF is "0". When the error flag EF is "0" (Yes at Step S310), the processing proceeds to Step S315, and when the error flag EF is "1" (No at Step S310), the processing proceeds to Step S330.

At Step S315, the processor 2A acquires the re-read flag RF from the read data RD, and determines whether the acquired re-read flag RF is "0". When the re-read flag RF is "0" (Yes at Step S315), the processing proceeds to Step S320, and when the re-read flag RF is "1" (No at Step S315), the processing proceeds to Step S345.

At Step S320, the processor 2A generates a single image file including the extracted images. After the processing of Step S320, the processing proceeds to Step S325.

Meanwhile, at Step S330, the processor 2A discards images to be objects of discarding (hereinafter may be referred to as "discarding images") out of the extracted images.

Then, at Step S335, the processor 2A determines whether the termination notice has been received from the image reading apparatus 1. The receiving of the termination notice by the processor 2A is carried out via the communication module 2C. When the termination notice has been received by the processor 2A (Yes at Step S335), the processing proceeds to Step S340, and when the termination notice has not been received by the processor 2A (No at Step S335), the processing returns to Step S300.

At Step S340, the processor 2A generates a single image file including images other than the discarding images (hereinafter may be referred to as "non-discarding images") out of the extracted images. After the processing of Step S340, the processing proceeds to Step S325.

Furthermore, at Step S345, the processor 2A generates a single image file including the non-discarding images and the images that have been extracted at Step S305 after returning to Step S300 from Step S335. After the processing of Step S345, the processing proceeds to Step S325.

At Step S325, the processor 2A transmits the image file generated at Step S320, the image file generated at Step S340, or the image file generated at Step S345 to the image storage device 3 by using the communication module 2C. The image storage device 3 receives the image file transmitted from the image processing apparatus 2 and stores therein the received image file. With the processing of Step S325, the flowchart illustrated in FIG. 9 is terminated.

Operation of Image Processing System

FIG. 10 to FIG. 14 are diagrams for explaining operation examples of the image processing system of the first embodiment of the present disclosure. In the following description, the operation examples of the image processing system 10 will be explained by separating into five cases of case C1 to case C5. In the following cases C1 to C5, all cases are described with an example in which it has been determined in the processing of Step S125 in FIG. 7 that the opening/closing sensor 28 is turned on. Examples of the reading medium in the cases C1 to C5 include a name card and a receipt.

Figure 10:
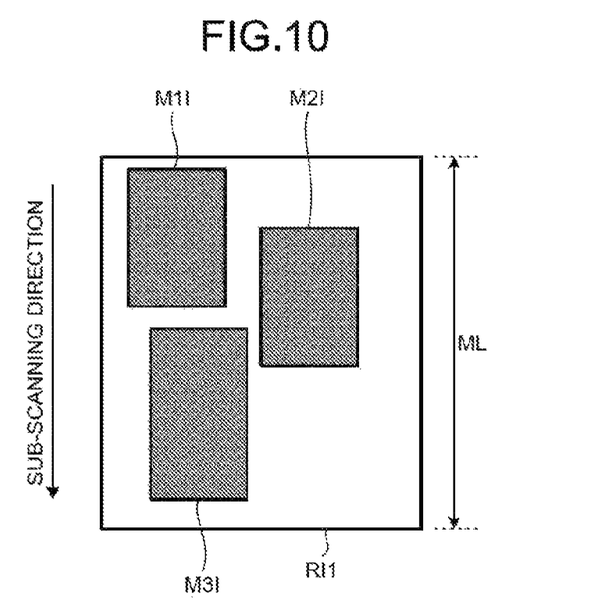
FIG. 10 is a diagram for explaining an operation example of the image processing system of the first embodiment of the present disclosure.

Case C1: FIG. 10

The case C1 is a case in which, in the image reading apparatus 1, the medium sensor 23 is turned off before the image read length RL exceeds the read maximum length ML, and until the medium sensor 23 is turned off after starting the measuring of the image read length RL, each image of the entire range of three reading media M1, M2, and M3 is read by the image sensor 17. Thus, in the case C1, as illustrated in FIG. 10, a read image RI1 having a certain read maximum length ML includes three medium images of medium images M1I, M2I, and M3I, which are images of the respective entire ranges of the reading media M1, M2, and M3, and no error has occurred on the read image RI1. As a result, in the case C1, in the read data RD, the read image RI1 includes the medium images M1I, M2I, and M3I, the error flag EF is set to "0", and the re-read flag RF is set to "0".

Thus, in the case C1, the image processing apparatus 2 extracts, at Step S305, the medium images M1I, M2I, and M3I from the read image RI1, and at Step S320, generates a single image file including all three medium images M1I, M2I, and M3I extracted at Step S305.

Figure 11:
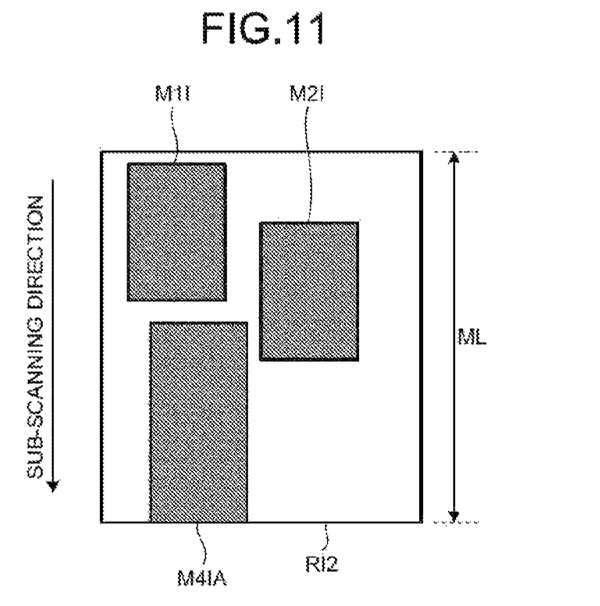
FIG. 11 is a diagram for explaining an operation example of the image processing system of the first embodiment of the present disclosure.

Case C2: FIG. 11

The case C2 is a case in which, in the image reading apparatus 1, while each image of three reading media M1, M2, and M4 is read by the image sensor 17 until the medium sensor 23 is turned off after starting the measuring of the image read length RL, the image read length RL has exceeded the read maximum length ML before the medium sensor 23 is turned off. In the case C2, at the time the image read length RL has exceeded the read maximum length ML, the image of the reading medium M4 is still being read. Thus, in the case C2, as illustrated in FIG. 11, a read image RI2 having a certain read maximum length ML includes two medium images, which are medium images M1I and M2I that are images of the respective entire range of the reading media M1 and M2 and one medium image, which is a medium image M4IA that is a portion of the range of the reading medium M4 still being read, and an error has occurred on the read image RI2. In the case C2, it is assumed that the operation button 29 is not pressed within a certain time Δta from the time at which the user of the image reading apparatus 1 is notified of the occurrence of error. As a result, in the case C2, in the read data RD, the read image RI2 includes the medium images M1I, M2I, and M4IA, the error flag EF is set to "1", and the re-read flag RF is set to "0". Furthermore, in the case C2, after the read data RD is transmitted from the image reading apparatus 1 to the image processing apparatus 2, a termination notice is transmitted from the image reading apparatus 1 to the image processing apparatus 2.

Thus, in the case C2, the image processing apparatus 2 extracts, at Step S305, the medium images M1I, M2I, and M4IA from the read image RI2. The image processing apparatus 2 discards, at Step S330, the medium image M4IA out of the medium images M1I, M2I, and M4IA. Then, the image processing apparatus 2 generates, at Step S340, a single image file including two medium images M1I and M2I that are non-discarding images.

In the image processing apparatus 2, the selection of discarding images is performed as follows. That is, the processor 2A detects, on each of medium images included in the read image RI, the end in the sub-scanning direction in the read image RI, and out of the medium images included in the read image RI, selects the medium image having the end located last in the sub-scanning direction in the read image RI as a discarding image. For example, when the medium images M1I, M2I, and M4IA are included in the read image RI2, the processor 2A detects, on each of the medium images M1I, M2I, and M4IA, the end in the sub-scanning direction in the read image RI2. Then, the processor 2A selects, out of the medium images M1I, M2I, and M4IA, the medium image M4IA that is the medium image having the end located last in the sub-scanning direction in the read image RI2 as the discarding image.

Figure 12:
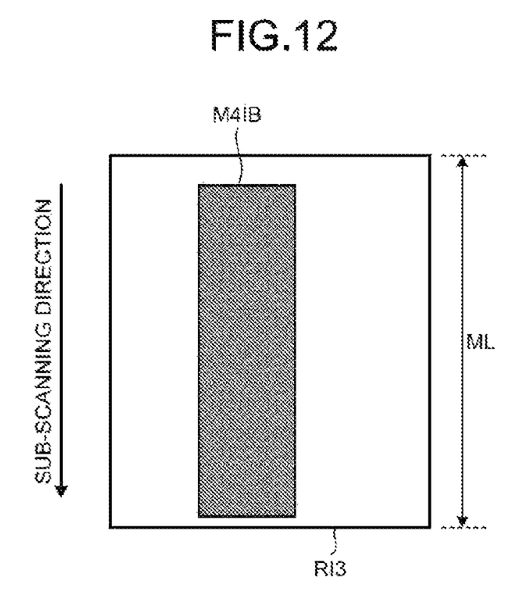
FIG. 12 is a diagram for explaining an operation example of the image processing system of the first embodiment of the present disclosure.

Case C3: FIG. 11 and FIG. 12

The case C3 is different from the case C2 in that, in the image reading apparatus 1, at the time of image reading of the first time, within a certain time Δta from the time at which the user of the image reading apparatus 1 is notified of the occurrence of an error, the opening/closing sensor 28 that has been on is turned on from off again after being turned off once and also the operation button 29 is pressed after the opening/closing sensor 28 is turned on from off. Furthermore, the case C3 is different from the case C2 in that, in the image reading apparatus 1, at the time of image reading of the first time, the medium sensor 23 is on at the time the operation button 29 is pressed within the certain time Δta from the time at which the user of the image reading apparatus 1 is notified of the occurrence of error. Thus, in the case C3, at the time of image reading of the first time, the termination notice is not transmitted from the image reading apparatus 1 to the image processing apparatus 2. Meanwhile, in the case C3, at the time of transmitting the read data RD of the first time, in the read data RD, as with the case C2, the read image RI2 includes the medium images M1I, M2I, and M4IA (FIG. 11), the error flag EF is set to "1", and the re-read flag RF is set to "0".

Furthermore, in the case C3, after the read data RD of the first time is transmitted, the re-read flag RF is set to "1". Then, in the case C3, at the time of re-reading the reading medium M4 after the re-read flag RF is set to "1" at Step S195 (that is, image reading of the second time), the medium sensor 23 is turned off before the image read length RL exceeds the read maximum length ML, and until the medium sensor 23 is turned off after starting the measuring of the image read length RL, the image of the entire range of the reading medium M4 is read by the image sensor 17. Thus, in the case C3, at the time of image reading of the second time following the image reading of the first time (that is, at the time of re-reading the reading medium M4), as illustrated in FIG. 12, in a read image RI3 having a certain read maximum length ML, a single medium image of a medium image M4IB, which is the image of the entire range of the reading medium M4 is included, and no error has occurred on the read image RI3. As a result, in the case C3, at the time of transmitting the read data RD of the second time, in the read data RD, the read image RI3 includes the medium image M4IB, the error flag EF is set to "0", and the re-read flag RF is set to "1".

Thus, in the case C3, when receiving the read data RD of the first time, the image processing apparatus 2 extracts, at Step S305, the medium images M1I, M2I, and M4IA from the read image RI2, and at Step S330, discards the medium image M4IA out of the medium images M1I, M2I, and M4IA. Because the termination notice is not received, after discarding the medium image M4IA, the processing returns to Step S300 from Step S335.

As a result, in the case C3, when receiving the read data RD of the second time, the image processing apparatus 2 extracts, at Step S305, the medium image M4IB from the read image RI3. In the read data RD of the second time, because the error flag EF is set to "0" and the re-read flag RF is set to "1", the image processing apparatus 2 generates, at Step S345, a single image file including a total of three medium images, that is, two medium images M1I and M2I that are non-discarding images and one medium image of the medium image M4IB extracted from the read data RD of the second time.

Figure 13:
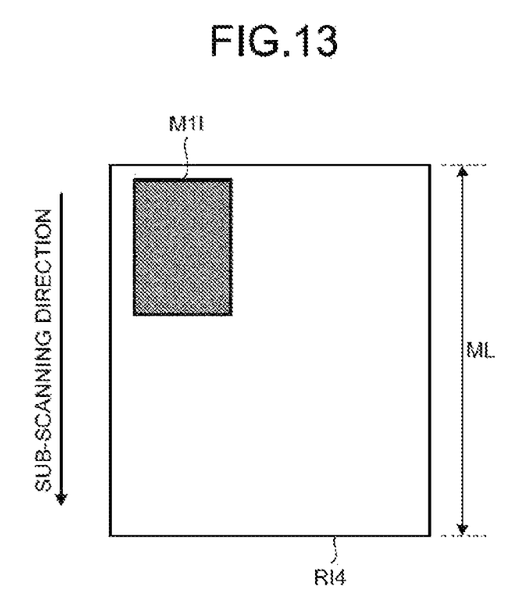
FIG. 13 is a diagram for explaining an operation example of the image processing system of the first embodiment of the present disclosure.

Case C4: FIG. 13

The case C4 is different from the case C1 in that, while the read image RI1 includes three medium images M1I, M2I, and M3I in the case C1 (FIG. 10), a reading image RI4 includes a single medium image M1I.

Thus, in the case C4, the image processing apparatus 2 extracts from the read image RI4, at Step S305, the medium image M1I, which is a single medium image included in the read image RI4, and at Step S320, generates a single image file including the single medium image M1I extracted at Step S305.

Figure 14:
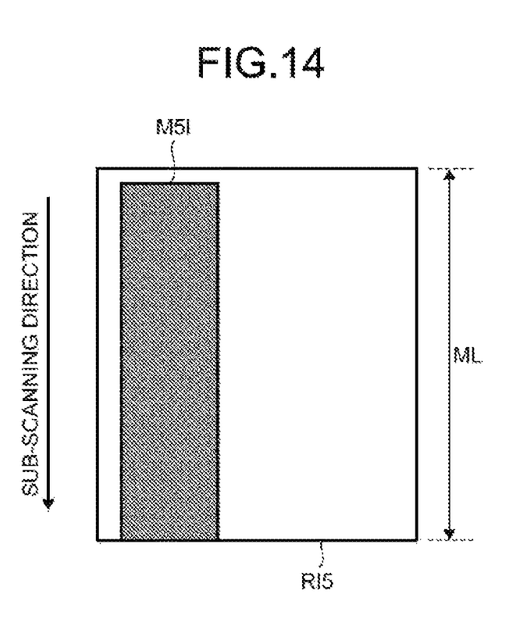
FIG. 14 is a diagram for explaining an operation example of the image processing system of the first embodiment of the present disclosure.

Case C5: FIG. 14

The case C5 is different from the case C2 in that, while the image read length RL has exceeded the read maximum length ML during the reading of the image of the reading medium M4 out of three reading media M1, M2, and M4 in the case C2 (FIG. 11), the image read length RL has exceeded the read maximum length ML during the reading of the image of a single reading medium M5. Accordingly, in the case C5, as illustrated in FIG. 14, a read image RI5 having a certain read maximum length ML includes a single medium image of a medium image M5I that is an image of a portion of the range of the single reading medium M5 in reading, and an error has occurred on the read image RI5.

Thus, in the case C5, the image processing apparatus 2 extracts from the read image RI5, at Step S305, the medium image M5I, which is a single medium image included in the read image RI5, and at Step S330, discards the single medium image M5I. Accordingly, in the case C5, because a medium image to be a subject of transmission to the image storage device 3 is not present, the image processing apparatus 2 does not perform the processing of Step S340 and Step S325.

As stated above, the first embodiment has been described.

Second Embodiment

A whole or some of each processing in the image reading apparatus 1 in the foregoing may be implemented by having the processor 21 execute a program corresponding to each processing. For example, the program corresponding to each processing in the foregoing may be stored in the memory 22 and the program may be read out from the memory 22 and executed by the processor 21. Furthermore, the program may be stored in a program server connected to the image reading apparatus 1 via any desired network, downloaded to the image reading apparatus 1 from the program server, and executed, or may be stored in a recording medium readable by the image reading apparatus 1, read out from the recording medium, and executed. Examples of the recording medium readable by the image reading apparatus 1 include a portable storage medium such as a memory card, a USB memory, an SD card, a flexible disk, a magneto-optical disc, a CD-ROM, a DVD, a Blu-ray (registered trademark) disc, and the like. The program is a data processing method described in any desired language or any desired description method, and the format of source code, binary code, and the like does not matter. Furthermore, the program is not necessarily limited to a single configuration and includes programs of a distributed configuration as a plurality of modules or a plurality of libraries and a program that, achieves the function collaboratively with a separate program represented by an OS.

As stated above, the second embodiment has been described.

As in the foregoing, the image processing system of the present disclosure (the image processing system 10 of the first embodiment) includes the image reading apparatus (the image reading apparatus 1 of the first embodiment) and the image processing apparatus (the image processing apparatus 2 of the first embodiment). The image reading apparatus determines whether an error has occurred on a read image (the read image RI of the first embodiment) that is an image read by the image sensor (the image sensor 17 of the first embodiment), and generates and transmits data (the read data RD of the first embodiment) including read images and error information (the error flag EF of the first embodiment) that is the information indicating the presence or absence of the occurrence of error. The image processing apparatus receives the data and performs, on the read images, image processing corresponding to the presence or absence of the occurrence of error based on the error information.

For example, the image reading apparatus of the present disclosure determines that an error has occurred on the read image when the reading length of the read image (the image read length RL of the first embodiment) has exceeded a pre-determined read maximum length (the read maximum length ML of the first embodiment) (in the first embodiment, Step S160: Yes, then Step S165).

Furthermore, for example, the image reading apparatus of the present disclosure determines an error has occurred on the read image when the cover of the image reading apparatus (the upper cover 13 of the first embodiment) is opened during the reading of the read image (Step S120 of the first embodiment) (in the first embodiment, Step S125: No, then Step S165).

This allows the image processing apparatus to perform image processing on the read image based on the error information received simultaneously with the read image. Thus, when performing the image processing on the read image, there is no need to determine whether the read image is a proper image by using image analysis. As a result, the processing load of the image processing apparatus can be reduced.

In addition, the read image of the present disclosure (the read image RI4 in the case C4 of the first embodiment) includes a single medium image that is an image of a single reading medium (the medium image M1I in the case C4 of the first embodiment), and the image processing apparatus of the present disclosure transmits the single medium image to the image storage device (the image storage device 3 of the first embodiment) when the error information indicates that no error has occurred (when the error flag EF of the first embodiment is "0").

The read image of the present disclosure (the read image RI1 in the case C1 of the first embodiment) includes a plurality of medium images that are respective images of a plurality of reading media (the medium images M1I, M2I, M3I in the case C1 of the first embodiment), and the image processing apparatus of the present disclosure transmits all of the medium images to the image storage device when the error information indicates that no error has occurred.

The read image of the present disclosure (the read image RI5 in the case C5 of the first embodiment) includes a single medium image that is an image of a single reading medium (the medium image M5I in the case C5 of the first embodiment), and the image processing apparatus of the present disclosure discards the single medium image when the error information indicates that an error has occurred (when the error flag EF of the first embodiment is "1").

The read image of the present disclosure (the read image RI2 in the case C2 of the first embodiment) includes a plurality of medium images that are respective images of a plurality of reading media (the medium images M1I, M2I, M4IA in the case C2 of the first embodiment), and the image processing apparatus of the present disclosure transmits non-discarding images (the medium images M1I, M2I in the case C2 of the first embodiment) that are the medium images other than discarding images out of the medium images to the image storage device while discarding the discarding images (the medium image M4IA in the case C2 of the first embodiment) that are medium images having an end located last in the sub-scanning direction in the read image out of the medium images when the error information indicates that an error has occurred.

This allows the image processing apparatus to promptly discard abnormal medium images that causes the occurrence of the error of the read image and to promptly transmit the medium images that have been read successfully.

Furthermore, the image processing apparatus of the present disclosure generates a single image file that includes first non-discarding images (the medium images M1I, M2I in the case C3 of the first embodiment), which are non-discarding images included in a first read image (the read image RI2 in the case C3 of the first embodiment) that is a read image read by first reading in the image reading apparatus (image reading of the first time in the first embodiment), and medium images (the medium image M4IB in the case C3 of the first embodiment) included in a second read image (the read image RI3 in the case C3 of the first embodiment) that is a read image read by second reading (image reading of the second time in the first embodiment) following the first reading in the image reading apparatus and on which no error has occurred, and transmits the generated single image file to the image storage device.

This allows a plurality of medium images that were successfully read by a plurality of consecutive reading to be combined into a single image file, and thus, the time and labor in the management of image files by the user of the image reading apparatus can be reduced.

According to the technology of the disclosure, the processing load of the image processing apparatus can be reduced.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing system comprising:
   an image reading apparatus configured to determine whether an error occurs on a read image that is an image read by an image sensor, to generate data including the read image and error information that is information indicating presence or absence of occurrence of the error, and to transmit the data; and
   an image processing apparatus configured to receive the data and to perform, on the read image, image processing corresponding to the presence or absence of occurrence of the error, based on the error information,
   wherein the read image includes a plurality of medium images that are respective images of a plurality of reading media, and
   wherein when the error information indicates that the error occurs, the image processing apparatus discards a discarding image that is a medium image having an end located last in a sub-scanning direction in the read image out of the medium images and transmits a non-discarding image that is a medium image other than the discarding image out of the medium images to an image storage device.

2. The image processing system according to claim 1, wherein the image reading apparatus determines that the error occurs on the read image when a reading length of the read image exceeds a pre-determined read maximum length.

3. The image processing system according to claim 1, wherein the image reading apparatus determines that the error occurs on the read image when a cover of the image reading apparatus is opened during the reading of the read image.

4. The image processing system according to claim 1, wherein
   the image processing apparatus transmits all of the medium images to an image storage device when the error information indicates that the error does not occur.

5. The image processing system according to claim 1, wherein the image processing apparatus generates a single image file that includes a first non discarding image that is the non-discarding image included in a first read image that is the read image read by first reading in the image reading apparatus, and a medium image included in a second read image on which the error does not occur, the second read image being the read image read by second reading following the first reading in the image reading apparatus, and transmits the generated single image file to the image storage device.

6. An image processing method in an image processing system including an image reading apparatus and an image processing apparatus, the image processing method comprising:
   determining, by the image reading apparatus, whether an error occurs on a read image that is an image read by an image sensor, generating data including the read image and error information that is information indicating presence or absence of occurrence of the error, and transmitting the data; and
   receiving, by the image processing apparatus, the data and performing, on the read image, image processing corresponding to the presence or absence of occurrence of the error, based on the error information,
   wherein the read image includes a plurality of medium images that are respective images of a plurality of reading media, and
   wherein the image processing method further comprises, when the error information indicates that the error occurs, discarding, by the image processing apparatus, a discarding image that is a medium image having an end located last in a sub-scanning direction in the read image out of the medium images; and transmitting, by the image processing apparatus, a non-discarding image that is a medium image other than the discarding image out of the medium images to an image storage device.

* * * * *